(12) United States Patent
Urien

(10) Patent No.: US 6,944,650 B1
(45) Date of Patent: Sep. 13, 2005

(54) SYSTEM FOR ACCESSING AN OBJECT USING A "WEB" BROWSER CO-OPERATING WITH A SMART CARD

(75) Inventor: Pascal Urien, Villepreux (FR)

(73) Assignee: CP8 Technologies, Paris (FR)

( * ) Notice: Subject to any disclaimer, the term of this patent is extended or adjusted under 35 U.S.C. 154(b) by 0 days.

(21) Appl. No.: 09/700,428

(22) PCT Filed: Mar. 15, 2000

(86) PCT No.: PCT/FR00/00625

§ 371 (c)(1),
(2), (4) Date: Nov. 15, 2000

(87) PCT Pub. No.: WO00/56030

PCT Pub. Date: Sep. 21, 2000

(30) Foreign Application Priority Data

Mar. 15, 1999 (FR) .................................. 99 03172

(51) Int. Cl.[7] .............................................. G06F 15/16
(52) U.S. Cl. ...................... 709/217; 709/200; 709/202; 709/223; 709/225; 709/229; 705/41; 710/11; 713/200; 455/426.1; 455/558; 379/93.1
(58) Field of Search ................................ 709/217, 200, 709/229, 202, 225, 223; 713/200; 705/41, 705/65, 76; 710/11; 455/426.1, 558; 235/380; 379/93.1

(56) References Cited

U.S. PATENT DOCUMENTS

| | | | | |
|---|---|---|---|---|
| 5,590,197 A | * | 12/1996 | Chen et al. | 705/65 |
| 5,694,471 A | * | 12/1997 | Chen et al. | 705/76 |
| 5,812,765 A | * | 9/1998 | Curtis | 709/200 |
| 5,898,838 A | | 4/1999 | Wagner | |
| 5,905,908 A | * | 5/1999 | Wagner | 710/11 |
| 6,199,114 B1 | * | 3/2001 | White et al. | 709/229 |
| 6,226,744 B1 | * | 5/2001 | Murphy et al. | 713/200 |

(Continued)

FOREIGN PATENT DOCUMENTS

| | | |
|---|---|---|
| WO | WO 98 57474 A | 12/1998 |
| WO | WO 99 14678 | 3/1999 |

OTHER PUBLICATIONS

Peisel, B: "designing the next step in internet appliances" Electronic Design, US, Penton Publ., Cleveland, Ohio, vol. 46 No. 7, Mar. 23, 1998, p. 50, 52, 56, XP000780455 ISSN 0013-4872.

(Continued)

*Primary Examiner*—Jack B. Harvey
*Assistant Examiner*—Hai V. Nguyen
(74) *Attorney, Agent, or Firm*—Miles & Stockbridge P.C.; Edward J. Kondracki

(57) ABSTRACT

The invention relates to a method and an architecture for securely accessing virtual objects ($Obv_i$) distributed in systems connected to the internet network (RI), and for obtaining an instance of same. This access is performed via a smart card (2a), through a "web" browser (10). The terminal (1) and the smart card (2a) each comprise a specific protocol layer (13, 23a). The latter comprises intelligent agents (132, $232a_1$) for establishing two-way data exchange sessions, thereby allowing the smart card (2a) to have a "web" server functionality. The smart card (2a) also comprises intelligent agents, called script translators, and a virtual file management system (8) cooperating with a specialized script-translating intelligent agent (7). Each virtual object ($Obv_i$) is associated with a virtual file of the virtual file management system (8). The specialized intelligent agent (7) presents the browser (10) with a list of the accessible virtual objects ($Obv_i$) and generates methods for accessing these objects.

15 Claims, 8 Drawing Sheets

U.S. PATENT DOCUMENTS

| | | | |
|---|---|---|---|
| 6,247,644 B1 * | 6/2001 | Horne et al. | 235/380 |
| 6,282,522 B1 * | 8/2001 | Davis et al. | 705/41 |
| 6,549,773 B1 * | 4/2003 | Linden et al. | 455/426.1 |
| 6,735,627 B2 * | 5/2004 | Urien | 709/223 |
| 6,751,671 B1 * | 6/2004 | Urien | 709/229 |
| 6,839,756 B1 * | 1/2005 | Boudou et al. | 709/225 |
| 2002/0124092 A1 * | 9/2002 | Urien | 709/229 |
| 2002/0138549 A1 * | 9/2002 | Urien | 709/202 |
| 2002/0174071 A1 * | 11/2002 | Boudou et al. | 705/41 |
| 2003/0086542 A1 * | 5/2003 | Urien | 379/93.01 |
| 2004/0147285 A1 * | 7/2004 | Urien | 455/558 |

OTHER PUBLICATIONS

Biget et al.: "How Smart Cards can Benefit from Object Oriented Technologies" Future Generations Computer Systems, NL, Elsevier Science Publishers, Amsterdam, vol. 13, No. 1-Jul. 1, 1997 pp. 75-90, XP004081711.

Paradinas P N Vandewale J J: "A Personal and Portable Database Server: The CQL Card" Applications of Databases, International Conference, XX, XX Jun. 21, 1994, pp. 444-457 XP002129612.

* cited by examiner

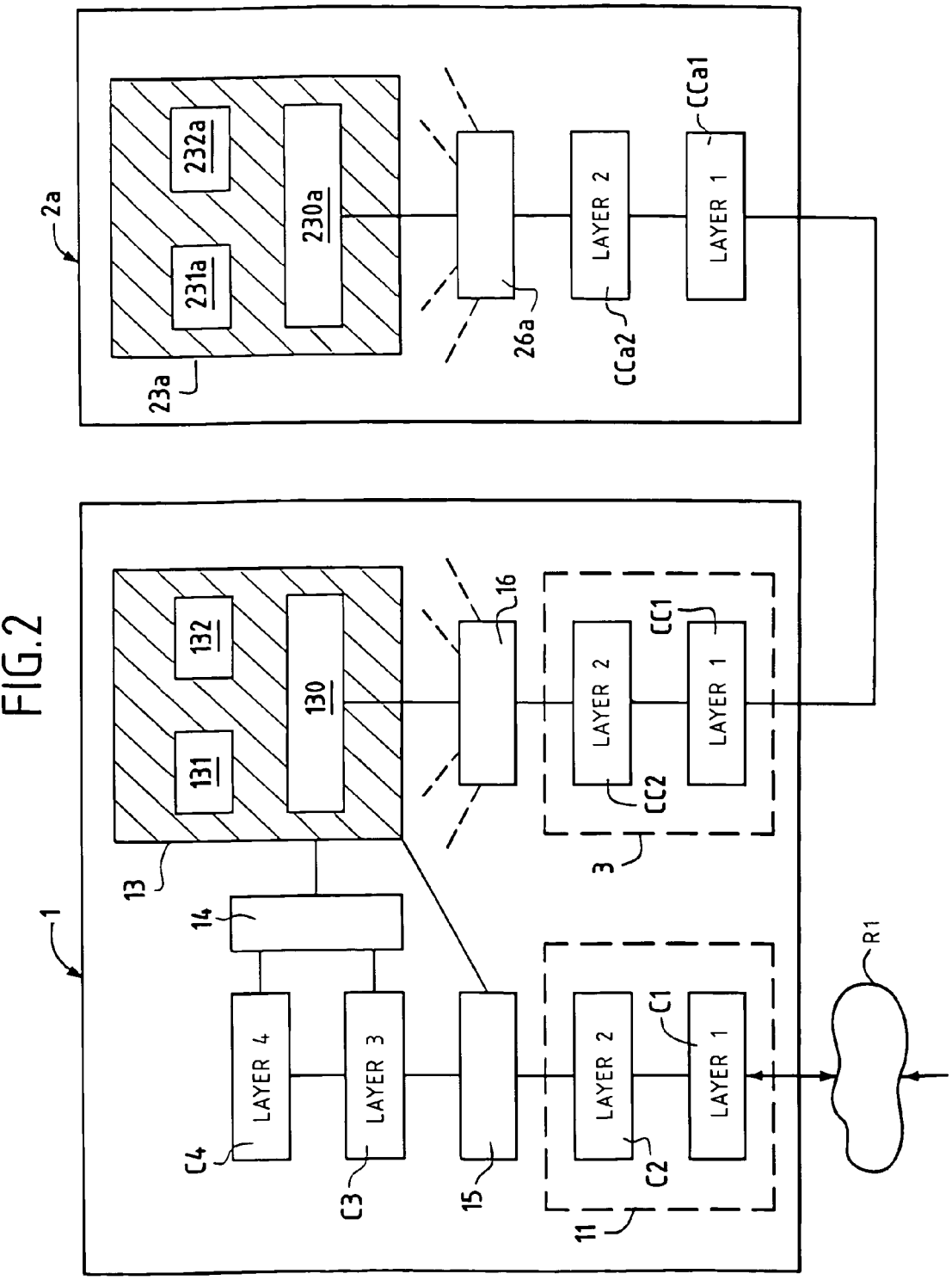

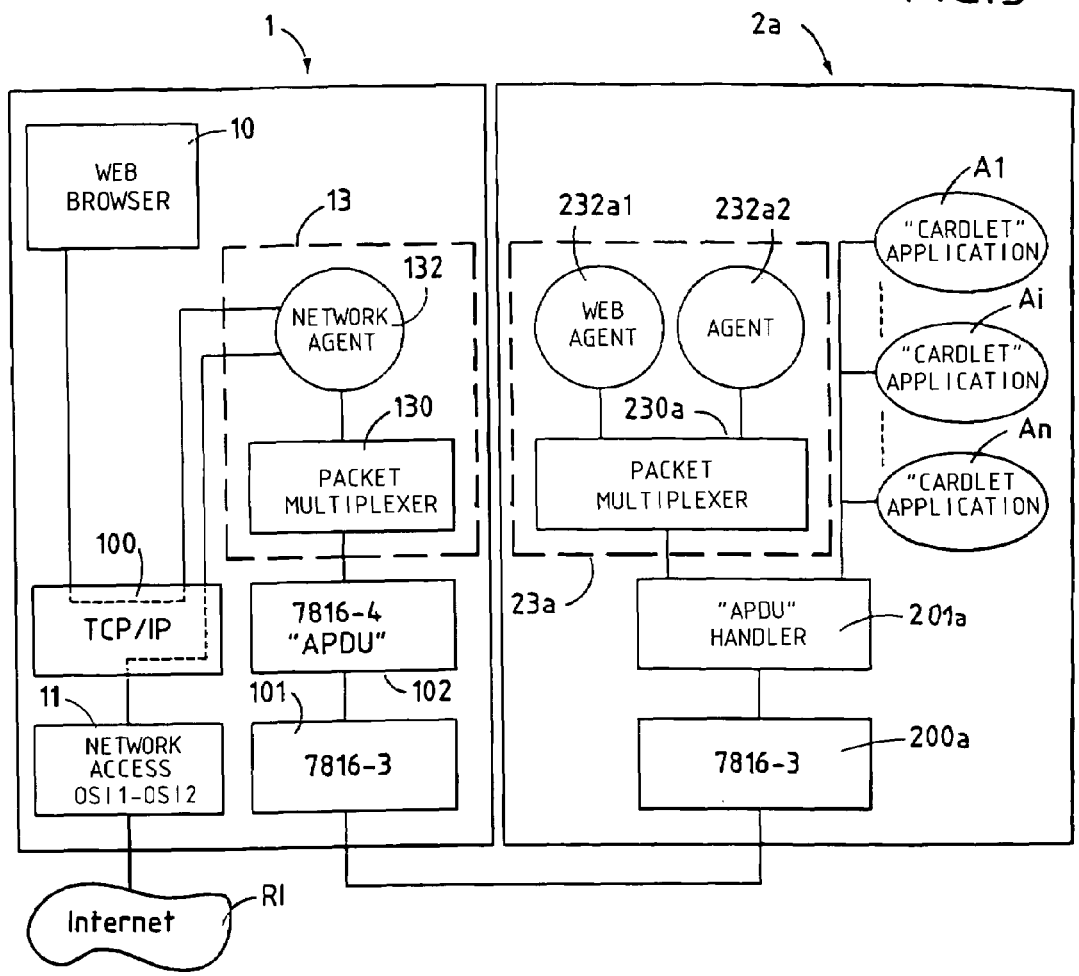
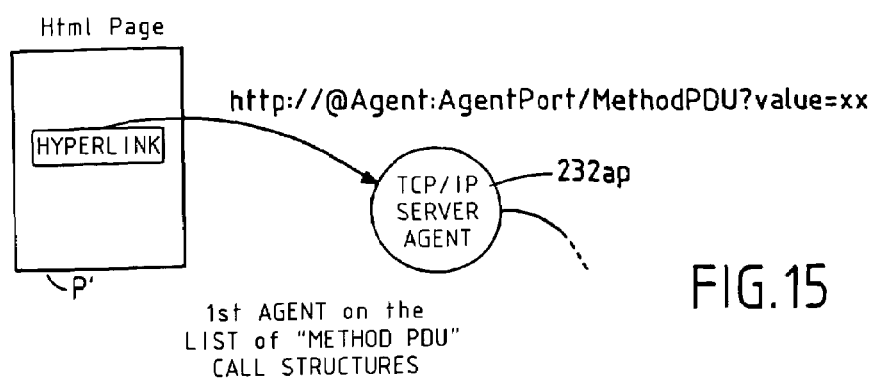

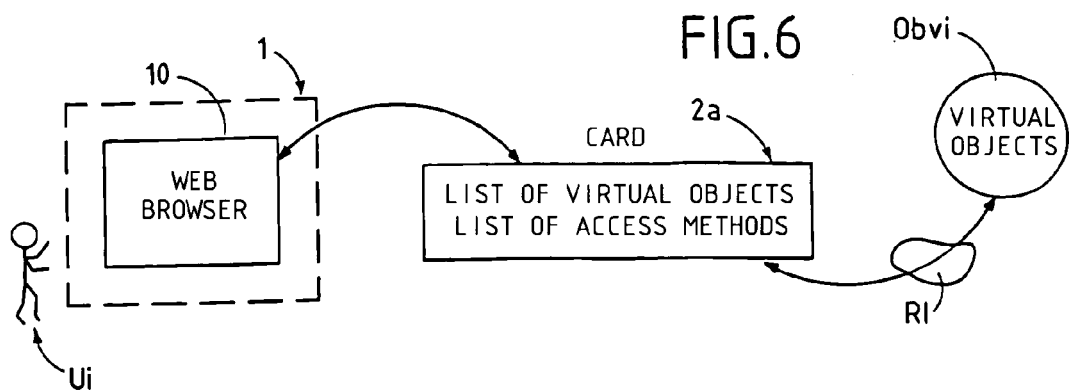
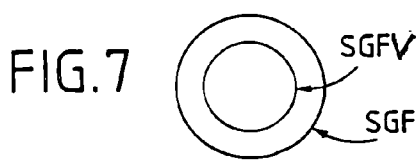
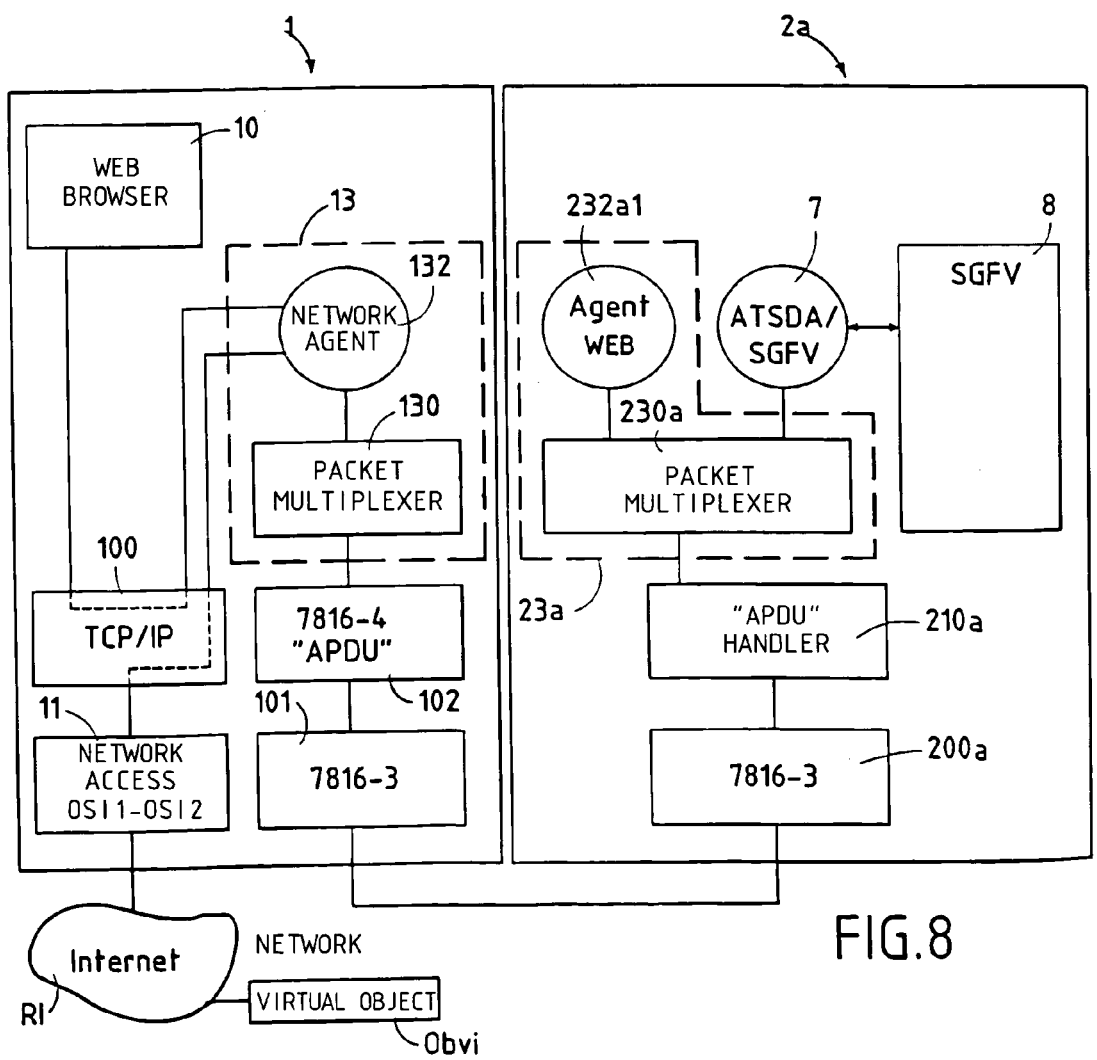

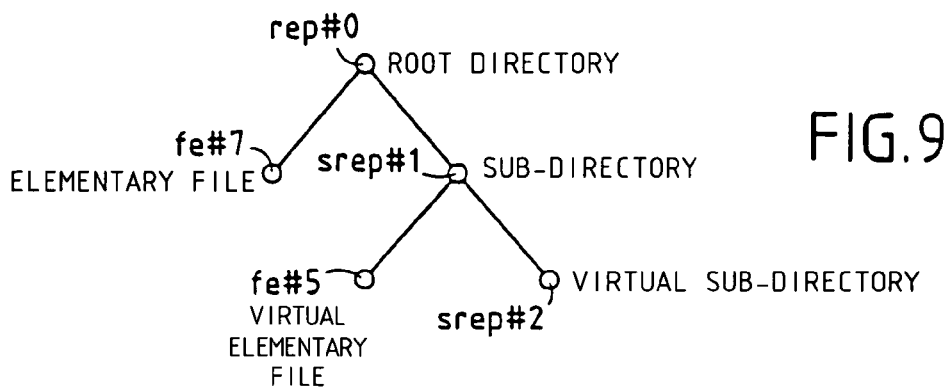
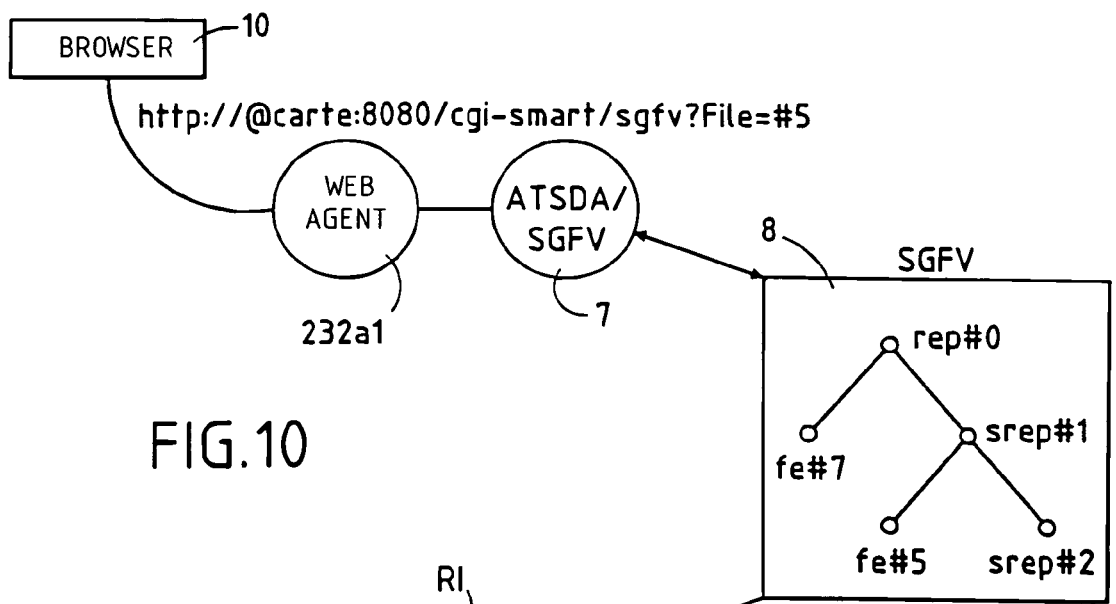
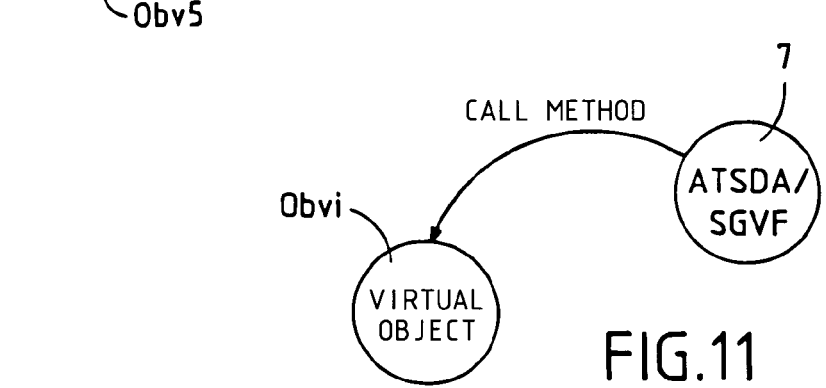

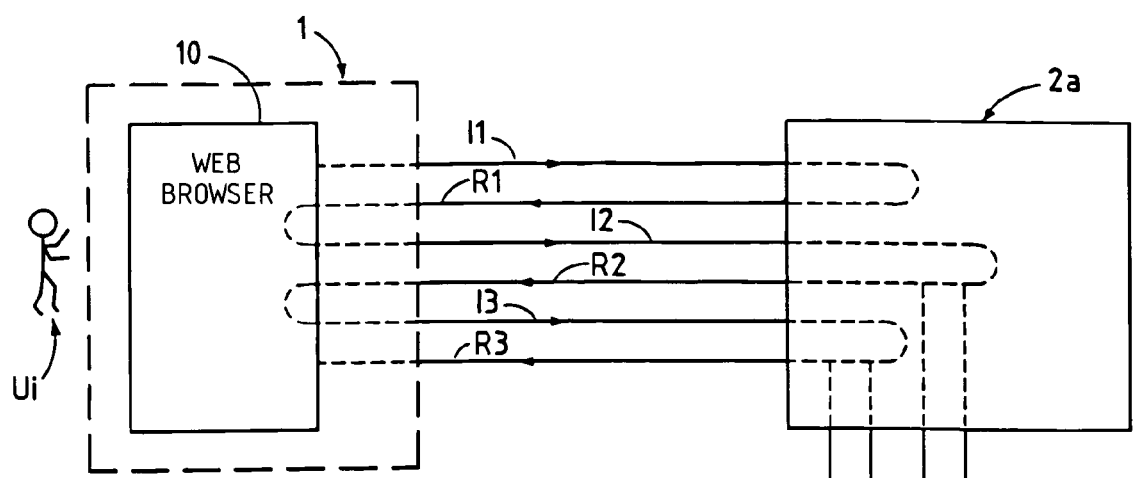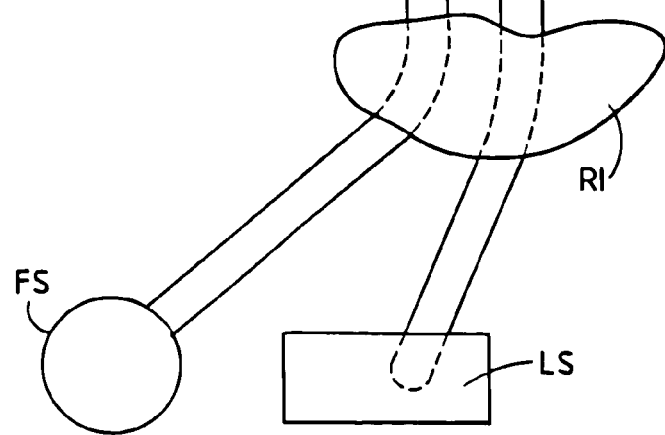
FIG.14

SYSTEM FOR ACCESSING AN OBJECT USING A "WEB" BROWSER CO-OPERATING WITH A SMART CARD

FIELD OF THE INVENTION

The invention relates to an embedded system containing information that makes it possible to instantiate an object located in a network, and a method for instantiating this object.

More specifically, the invention relates to a method for secure access to this object.

BACKGROUND DEFINITIONS

Within the scope of the invention, the term "object" should be considered in its most general sense. It includes many types of computer resources, such as text files, image files, or multimedia files (video, sound, etc.). It also includes transactions or connections to a computer system based on a given protocol.

In the first case, the objects will be considered herein to be static, since their instances are not time-dependent. In the second case, the objects will be said to be dynamic, since their instances vary with time. A non-limiting example; within the framework of an internet network, would be a "Telnet" connection.

Also within the scope of the invention, the term "user station" should also be understood in a general sense. The aforementioned user station may be constituted, in particular, by a personal computer running on various operating systems, such as WINDOWS or UNIX (both of which are registered trademarks). It can also be constituted by a workstation, a portable computer, or a so-called "dedicated" card terminal.

Likewise, within the scope of the invention, the term "network" includes the global network known as any network comprising a set of servers linked to one another, particularly a global network in which information is transported end-to-end. It specifically includes the Internet, any network in which data is exchanged using an Internet protocol, private enterprise or similar networks known as "intranets," and the networks that extend them to the outside, known as "extranets." It could also be a GSM (Global System Mobile), ATM, UMTS, or GPRS (Global Packet Radio System) network, or a so-called "Wireless Network," for example 13E. 802.11.

DESCRIPTION OF RELATED ART

Hereinafter, without in any limiting its scope, we will focus on the preferred application of the invention, unless otherwise indicated. We will therefore consider a user station, which will simply be called a "terminal," equipped with a smart card reader and connected to an internet network.

A chip-card based application system generally comprises the following main elements:
 a smart card;
 a host system constituting the aforementioned terminal;
 a communication network, i.e. the internet network in the preferred application;
 and an application server connected to the network.

FIG. 1A schematically illustrates an exemplary architecture or system of this type. The terminal 1, for example a personal computer, comprises a smart card 2 reader 3. This reader 3 may or may not be physically integrated into the terminal 1. The smart card 2 includes an integrated circuit 20 whose input-output connections are present on the surface of its substrate so as to allow an electric power supply and communications with the terminal 1. The latter comprises circuits for accessing a data transmission network RI. These circuits depend, in particular, on the nature of the network RI and the terminal 1. For example, they could comprise a network card for a local area network or a modem for connecting to a switched telephone line or to an Integrated Services Digital Network ("ISDN") for connecting to the Internet, for example via an Internet Service provider ("ISP").

The terminal 1 naturally comprises all of the circuits and components required for its proper operation, which have not been represented in order to simplify the drawing: central processor, RAM and ROM, magnetic disk mass storage, diskette drive and/or CD-ROM, etc.

Normally, the terminal 1 is also connected to standard peripherals, whether integrated or not, such as a display screen 5 and a keyboard 6.

The terminal 1 can be placed in communication with servers or any computer systems connected to the network RI, one of which 4 is illustrated in FIG. 1A. "Server" is understood to mean any information server capable of handling communication protocols, either to provide access to documents, or to provide access to machines. In the case of the preferred application of the invention, the access circuits 11 place the terminal 1 in communication with the servers 4 using a particular piece of software 10, called a "web browser." The latter makes it possible to access various applications distributed throughout the network RI, generally in a "client-server" mode. "Browser" is understood to indicate any means offering the following functions:
 the display of a page, particularly a page in "SGML" (Standard Generalized Markup Language);
 the downloading of resources offered on the page.

This function corresponds to what is meant by the term "browser." An SGML page contains presentation attributes, and links to other SGML documents, or "hyperlinks" to the outside world, i.e. URIs (Universal Resource Identifiers). The SGML language is known to include several dialects, including HTML, XML, and WML.

Normally, communications in networks take place based on protocols that conform to standards comprising several superposed software layers. In the case of an internet network RI, the communications take place based on protocols specific to this type of communication, which will be described in detail below, and which also comprise several software layers. The communication protocol is chosen based on the specific application envisioned: interrogation of "web" pages, file transfers, electronic mail (or "e-mail"), forums or "news," etc.

The logical architecture of the system, which comprises a terminal, a smart card reader and the smart card, is represented schematically by FIG. 1B. It is described by the ISO 7816 standard, which itself comprises several sub-sections:
 ISO 7816-1 and 7816-2 related to the dimensions and the marking of the cards;
 ISO 7816-3 related to the transfer of data between the terminal and the smart card; and
 ISO 7816-4 related to the structure of the set of commands and the format of the commands.

In FIG. 1B, on the terminal 1 end, only the layers corresponding to the ISO 7816-3 standard, referenced 101, and the "APDU" command handler (ISO 7816-4 standard), referenced 201, are represented. On the smart card 2 end, the layers corresponding to the ISO 7816-3 standard are referenced 200 and the "APDU" command handler (ISO 7816-4 standard) is referenced 201. The applications are referenced $A_1, \ldots, A_i, \ldots A_n$; n being the maximum number of applications present in the smart card 2.

A "cardlet" (registered trademark) application $A_i$ present in the smart card 2 (FIG. 1A) dialogues with the terminal 1 using a set of commands. This set typically includes write commands and read commands. The format of the commands is known by the abbreviation "APDU" (for "Application Protocol Data Unit"). It is defined by the aforementioned ISO 7816-4 standard. A command "APDU" is written "APDU.command" and a response "APDU" is written "APDU.response". The "APDUs" are exchanged between the card reader and the smart card using a protocol specified by the aforementioned ISO 7816-3 standard (for example in character mode: T=0; or in block mode: T=1).

When the smart card 2 includes several distinct applications, as illustrated in FIG. 1B, it is said to be a multi-applicative card. However, the terminal 1 dialogues with only one application at a time. An application $A_i$ is present, for example, in the form of a piece of software called an "applet," in "Java" (registered trademark) language, which will hereinafter be called a "cardlet." The selection of a particular "cardlet" $A_i$ is obtained by means of an "APDU" of the selection type ("SELECT"). Once this choice has been made, the "APDUs" that follow it are routed to this "cardlet." A new "SELECT APDU" will have the effect of aborting the application in progress and choosing another one. The software subsystem that handles the "APDUs" 201 makes it possible to choose a particular application $A_i$ in the smart card 2, to store the application thus chosen, and to transmit and/or receive "APDUs" to and from this application.

To summarize what has just been described, the selection of an application $A_i$ and the dialogue with the latter are achieved through exchanges of "ADPU" commands. It is assumed that the applications $A_i$ are conventional applications, which will hereinafter be called "GCAs" (for "Generic Card Applications").

In a chip-card based application system as illustrated by the architecture of FIG. 1B, various functions can be devolved to the smart card, especially security functions. It is actually advantageous to store the data linked to security (passwords, access rights, etc.) in a smart card that can be retained by the user. Furthermore, the data being stored in a read-only memory in a form that can be encrypted, it is not easily modifiable, or even directly readable from the outside.

However, it must be noted that the card 3 cannot communicate directly with the browsers on the market, unless the code of these browsers is modified. The current smart cards, which also conform to the standards mentioned above, have a hardware and software configuration that does not allow them to communicate directly with the Internet network either. In particular, they cannot receive and transmit data packets using any of the protocols used in this type of network. It is therefore necessary to provide an additional piece of software, installed in the terminal 1, generally in the form of what is called a "plug-in." This piece of software, which has the reference 12 in FIG. 1A, provides the interface between the browser 10 and the card 2, more precisely the electronic circuits 20 of this card 2. In the current state of the art, the host system associated with the card reader 3, i.e. the terminal 1, is also associated with a particular application. In other words, it is necessary to provide a specific, so-called "dedicated" terminal for each specific application.

Furthermore, it is clear that, even given the rapid past evolution of the technologies and their foreseeable future evolution, the capacity for storing information in the random access or read-only storage circuits of a smart card remains, and will remain, very limited as compared to that offered by a terminal "hosting" this smart card, and naturally to those offered by larger systems, "minicomputers" or giant so-called "mainframe" systems. Also, it is not possible to store the data of a large number of applications in a smart card, particularly very large multimedia files.

SUMMARY OF THE INVENTION

The object of the invention is to eliminate the drawbacks of the devices of the prior art, some of which have been summarized, while meeting the needs that continue to arise. It must be possible, in particular, to be able to access a large number of applications, even those with a large quantity of data, of various natures and distributed throughout the Internet. Moreover, in a preferred embodiment, the accesses should benefit from maximum security, i.e. in practice, should take place via, and under the control of, a smart card containing all the data required to protect data exchanges. Finally, these accesses must be able to be achieved via a browser on the market and be transparent for a user, who should "see" the smart card as the only source, no matter where the application is stored.

According to a first characteristic of the method, the smart card presents the host system, i.e. the terminal, with a virtual terminal module, for example in the form of a page in "HTML" (HyperText Markup Language), or more generally in hypertext language, or even in the form of an "applet" in "Java" (registered trademark) language, which allows the user to choose a particular application from among those available and offered by the smart card. As a result, the terminal is generalized and supports a plurality of applications. The host system is seen as a peripheral of the smart card, and it makes hardware resources, such as a display screen, a keyboard, etc., available to the card.

To do this, a specific software communication layer is provided in the smart card and its counterpart in the terminal. The term "specific" should be understood to mean specific to the method of the invention. In essence, these so-called specific communication layers are generalized no matter what the application in question. They come into play only in the two-way data exchange process between the smart card and the terminal, and between the smart card and the network.

The specific software communication layers comprise, in particular, software components called "intelligent agents," which specifically allow protocol conversions. There are matching agents in the respective specific communication layers associated with the terminal and with the smart card. According to the method of the invention, sessions are established between matching agents.

According to a second important characteristic, the method of the invention makes it possible to activate conventional applications, i.e. of the aforementioned "GCA" type, located in a smart card, without having to modify them in any way.

To do this, one or more intelligent agents called script translators are provided, which receive requests from a browser and translate them into "APDU" commands comprehensible to the "GCA" application. This technical characteristic makes it possible to install, in a smart card whose architecture conforms to the method of the invention, a mechanism similar to the so-called "CGI" (Common Gateway Interface) function installed in conventional "web" servers.

Finally, according to another characteristic of the method of the invention, by implementing the aforementioned functions and mechanisms, it is possible to access computer resources distributed in a data transmission network to which the terminal is connected, particularly the Internet or a network of an equivalent type (intranet, extranet), without the user's having to know their locations. Hereinafter, as indicated, these resources will be called static or dynamic "virtual objects."

To do this, a script translating intelligent agent dedicated to this task is implemented, which cooperates with the other intelligent agents present in the terminal and/or the smart card. This agent makes it possible to define the virtual objects that the smart card, and thus the user (or holder of the smart card) can access, and provides the interrogating browser, via the smart card, with methods that make it possible to access these virtual objects.

The invention therefore relates to an embedded system, equipped with a chip comprising information processing means and information storage means and designed to cooperate with a network through a terminal, characterized in that:
  it stores at least one object file containing information associated with an object located in the network and making it possible to create an instance of this object;
  it comprises network interface means designed to cooperate with matching network interface means located in the terminal, so that the embedded system constitutes an information server in the network; and
  it comprises object file interface means, designed to establish a correspondence between information passing through the network interface means and assigned to at least said object file, and information exchanged with said object file.

Advantageously, the object file includes a piece of autonomous software executable in browser software. Advantageously, this piece of autonomous software is capable of implementing an object file management system of the embedded system.

Advantageously, said object file includes a description of actions to be performed in order to instantiate an object. Advantageously, the actions include actions performed inside the embedded system and consisting in sessions between agents of the embedded system.

Advantageously, the actions include actions performed outside the embedded system and consisting in sessions with agents of the terminal in order to obtain information from information servers of the network.

Advantageously, said network interface means are designed to cooperate with the matching network interface means located in the terminal, so that the embedded system acts like a client capable of connecting to at least one server of the network.

The invention also relates to a method for instantiating an object located in a network, using the aforementioned embedded system, characterized in that it makes it possible to describe a set of sessions between agents through an object file, by means of at least the following steps:
  establishing a list of the agents implemented;
  for each agent, defining call arguments necessary to the agent.

Advantageously, a call argument describes the opening of a session with another agent.

Advantageously, an agent modifies the list of arguments used by another agent.

In a variant, the method is characterized in that it implements sessions between agents described by an object file executed from the information server of the embedded system by means of at least the following steps:
  identification of an object file;
  execution of this object file.

Advantageously, the object file is identified by a particular directory name.

Advantageously, the object file is identified by a particular naming convention.

Advantageously, the object file is executed by instantiating the first agent associated with the object file.

Advantageously, the object file is executed by instantiating one or more agents referenced by the object file.

In a variant, the method is characterized in that it implements sessions between agents described by an object file executed from browser software by means of the following steps:
  loading by the browser software of an object file and a specific file capable of implementing it;
  execution of the specific software by the browser software.

Advantageously, the specific software is embodied in any interpreted language executable by the browser software.

Advantageously, the object file interpreter is embodied in browser software.

In a variant, the method is characterized in that it enables the embedded system to make it possible to implement sessions between agents described by an object file executed from browser software, and in that it comprises the step that consists of identifying, by means of a universal resource identifier, a specific software for implementing the browser software.

Advantageously, the universal resource identifier is integrated into a hypertext document.

Advantageously, said hypertext document is contained in the embedded system.

Advantageously, said hypertext document is contained in an information server of the network, remote from the embedded system.

Advantageously, said specific software is loaded by a method available in the browser software and deduced from the universal resource identifier.

The invention also relates to an embedded system, equipped with a chip comprising information processing means and information storage means and designed to cooperate with a network through a terminal, characterized in that it comprises network interface means designed to cooperate with matching network interface means located in the terminal, so that the embedded system constitutes an information server in the network and/or acts like a client capable of connecting to at least one server of the network. The invention also relates to a terminal designed to cooperate with a network and comprising information processing means, information storage means, and means for cooperating with an embedded system equipped with a chip comprising information processing means and information storage means, characterized in that it comprises network interface means designed to cooperate with matching network interface means located in the embedded system, so that the embedded system constitutes an information server in the network and/or acts like a client capable of connecting to at least one server of the network. Advantageously, the terminal dynamically acquires said network interface means from the network via a software loading mechanism. This could be, in particular, a "plug-in" mechanism. If the terminal does not know the extension of the file containing said software, it searches in a server for the software associated with this extension, usually called a "helper."

Advantageously, said matching network interface means, in the terminal and in the embedded system, constitute a stack comprising one or more communication layers such that they allow the embedded system to share all or some of the communication layers of the terminal. Moreover, the terminal advantageously has access points in its communication layers, which allow it to route a flow of information to or from one or more of these layers. These access points correspond to the points known by the name "SAP" (Service Access Point) defined by the ISO standard.

The invention also relates to an embedded system, equipped with a chip comprising information processing means and information storage means and designed to cooperate with a network through a terminal, characterized in that it comprises network interface means designed to cooperate with matching network interface means located in the terminal, so that at least part of a flow of information exchanged between an application of the terminal and the network passes through the network interface means of the embedded system, in accordance with criteria known by the terminal. The invention also relates to a terminal designed to cooperate with a network and comprising information processing means, information storage means, and means for cooperating with an embedded system, equipped with a chip comprising information processing means and information storage means, characterized in that it comprises network interface means designed to cooperate with matching network interface means located in the embedded system, so that at least part of a flow of information exchanged between an application of the terminal and the network passes through the network interface means of the embedded system, in accordance with criteria known by the terminal. The routing of part of the flow of information to the embedded system is advantageously performed by the information processing means of the terminal in accordance with pre-established criteria, either statically or in a way that is negotiated by a dialog with an embedded system; in the latter case, the terminal can, for example, ask the embedded system for its "IP" address (if it is the Internet), using known protocols. Advantageously, the aforementioned criteria include one of the following:

the "IP" address of the embedded system, or its "ATM" address in the case of an ATM network;

the IP address of the terminal and a particular "TCP" or "UDP" port;

any SAP access point that references the embedded system.

BRIEF DESCRIPTION OF THE DRAWINS

The invention will now be described in greater detail in reference to the attached drawings, in which:

FIGS. 1A and 1B schematically illustrate the hardware and software architectures, respectively, of an exemplary chip-card based application system according to the prior art;

FIG. 2 schematically illustrates an exemplary chip-card based application system according to the invention, the latter acting as a "web" server;

FIG. 3 illustrates, in simplified fashion, the logical architecture of a system in which the smart card comprises intelligent agents;

FIG. 6 is a diagram schematically illustrating an essential aspect of the method according to the invention through which it is possible to access virtual objects distributed in an internet network via a smart card and a "web" browser;

Figure 1A:
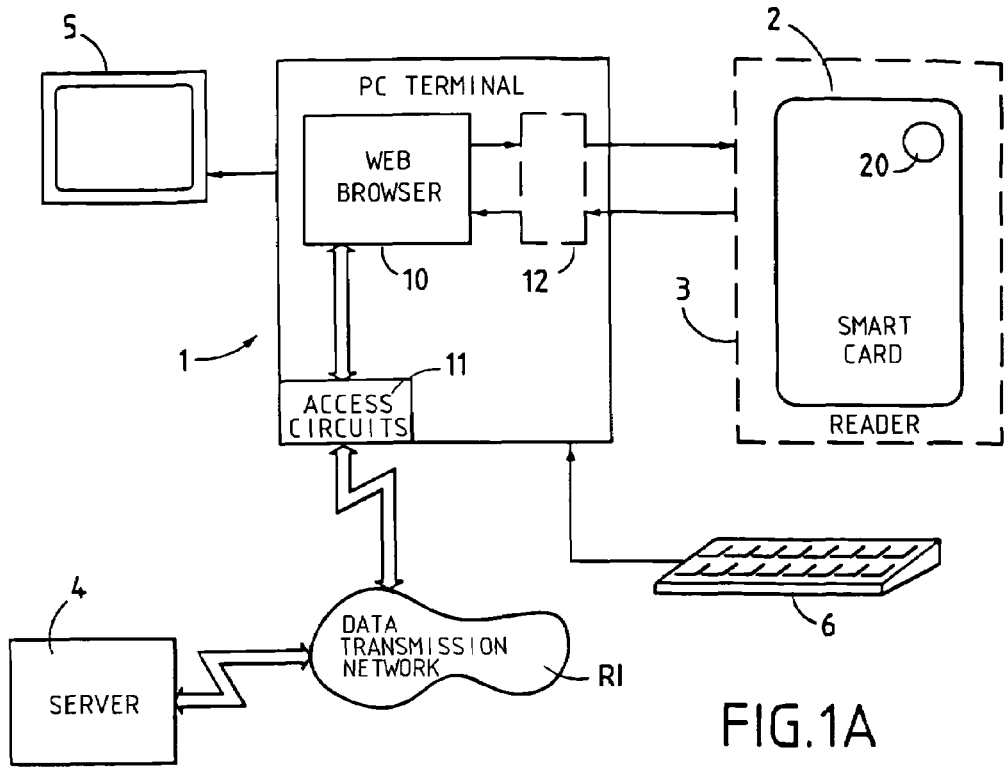

FIG. 7 schematically illustrates the organization of a so-called virtual file management system for implementing this aspect of the method of the invention;

FIG. 8 is an exemplary architecture comprising a virtual file management system according to FIG. 7;

FIGS. 9 through 15 are diagrams schematically illustrating several embodiments of the method according to the invention.

DESCRIPTION OF THE PREFERRED EMBODIMENTS(S)

Before describing the method activating applications located in a smart card according to the invention and detailing an architecture for its implementation, it is first appropriate to briefly summarize the chief characteristics of communication protocols in networks.

The architecture of communication networks is described in various layers. For example, the "OSI" ("Open Systems Interconnection") standard defined by the "ISO" comprises seven layers, which run from the so-called lower layers (for example the so-called "physical" layer that supports physical transmission) to the so-called upper layers (for example the so-called "application" layer), passing through intermediate layers, including the so-called "transport" layer. A data layer offers its services to the layer that is immediately above it and requires other services from the layer immediately below it, via appropriate interfaces. The layers communicate using primitives. They can also communicate with layers of the same level. In certain architectures, some of these layers may be non-existent.

In an Internet type environment, there are five layers, and more precisely, from the top layer to the bottom layer: the application layer ("http", "ftp", "e-mail", etc.), the transport layer ("TCP"), the network address layer ("IP"), the data link layer ("PPP", "SLIP", etc.) and the physical layer.

Having given this summary, we will now describe an architecture of a smart card-based application system that enables the smart card to act as a "web" server. An example of such an architecture is represented schematically in FIG. 2. The elements common to FIGS. 1A and 1B have the same references and will be re-described only as necessary. In order to simplify the drawing, the various peripherals connected to the terminal (FIG. 1A: screen 5 and keyboard 6, for example) are not represented.

With the exception of specific software communication protocol layers referenced 13 and 23a, respectively installed in the terminal 1 and the smart card 2a, the other hardware and software elements are common to the prior art.

The terminal 1 comprises circuits 11 for accessing the network RI, constituted for example by a modem for the Internet or a network card for a local area network. These circuits contain the lower software layers $C_1$ and $C_2$ corresponding to the "physical" and "data link" layers.

Also represented are the upper layers $C_3$ and $C_4$, corresponding to the "network address" ("IP" in the case of the Internet) and "transport" ("TCP") layers. The top application layer ("http", "ftp", "e-mail", etc.) is not represented.

The interface between the lower layers $C_1$ and $C_2$ and the upper layers $C_3$ and $C_4$ is constituted by a software layer generally called a "lower level driver." The upper layers $C_3$ and $C_4$ rely on this interface and are implemented by means of specific function libraries or network libraries 14, to which they correspond. In the case of the Internet, "TCP/IP" is implemented by means of libraries known as "sockets."

This organization enables a browser 10 (FIG. 1A) to submit requests to a server 4 (FIG. 1A) in order to consult "web" pages ("HTTP" protocol), transferring files ("FTP" protocol) or sending e-mail ("e-mail" protocol), in an entirely conventional way.

The terminal 1 also comprises a card reader 3, which may or may not be integrated. In order to communicate with the smart card 2a, the card reader also includes two lower layers $CC_1$ (physical layer) and $CC_2$ (data link layer), which play a role similar to the layers $C_1$ and $C_2$. The software interfaces with the layers $CC_1$ and $CC_2$ are described, for example by the "PC/SC" specification ("part 6, Service Provider"). The layers $CC_1$ and $CC_2$ themselves are described by the ISO 7816-1 through 7816-4 standards, as has been indicated.

An additional software layer 16 forms an interface between the applicative layers (not represented) and the lower layers $CC_1$ and $CC_2$. The main function devolved to this layer is a multiplexing/demultiplexing function.

The communications with the smart card 2a take place according to a paradigm similar to that used to handle files in an operating system of the "UNIX" (registered trademark) type: "OPEN", "READ", "WRITE", "CLOSE", etc. On the smart card end 2a, there is a similar organization, i.e. the presence of two lower layers, referenced $CCa_1$ (physical layer) and $CCa_2$ (data link layer), as well as an interface layer 26a, entirely similar to the layer 16.

According to a first characteristic, on both ends, i.e. in the terminal 1 and in the smart card 2a, two specific protocol layers are provided, respectively 13 and 23a.

In the terminal 1, the specific layer 13 interfaces with the "lower level drivers" 15, with the libraries 14 of the network layers $C_3$ and $C_4$, and with the protocol layers of the card reader 3, i.e. the lower layers $CC_1$ and $CC_2$, via the multiplexing layer 16. The specific layer 13 allows the transfer of network packets to and from the smart card 2a. In addition, it adapts existing applications such as the Internet browser 10 (FIG. 2), the e-mail software, etc., for utilizations involving the smart card 2a.

On the smart card end 2a, there is an entirely similar organization constituted by an additional instance of the specific layer, referenced 23a, the counterpart of the layer 13.

More precisely, the specific layers 13 and 23a are subdivided into three main software elements:

a module 130 or 230a for transferring blocks of information between the layers 13 and 23a, via the conventional layers $CC_1$, $CC_2$, $CCa_1$ and $CCa_2$;

one or more pieces of software called "intelligent agents," 132 or 232a, which perform, for example, protocol conversion functions;

and a module for managing the specific configuration 131 and 231a, respectively, which module may be integrated into a particular intelligent agent.

Hence, in the terminal 1 and the smart card 2a, there is a communication protocol stack between the two entities.

The level-2 layers (data link layers) $CC_2$ and $CCa_2$ handle the exchange between the smart card 2a and the terminal 1. These layers are responsible for the detection and possible correction of transmission errors. Various protocols are usable, the following being a non-exhaustive list of examples:

the ETSI GSM 11.11 recommendation;

the protocol defined by the ISO 7816-3 standard, in character mode T=0;

the protocol defined by the ISO 7816-3 standard, in block mode T=1;

or the protocol defined by the ISO 3309 standard, in "HDLC" (for "High-Level Data Link Control") frame mode.

For purposes of the invention, it is preferable to use the ISO 7816-3 protocol, in block mode. In an essentially known way, each protocol layer is associated with a certain number of primitives that allow the data exchanges between layers of the same level and from one layer to another. For example, the primitives associated with the level-2 layer are of the "data request" ("Data.request"), "data response" by the card ("Data.response"), and "data confirm" ("Data.confirm") types, etc.

More specifically, the layers 13 and 23a are responsible for the dialogue between the smart card 2a and the host, i.e. the terminal 1. These layers allow the exchange of information between a user (not represented) of the terminal 1 and the smart card 2a, for example via drop-down menus in the form of hypertext in the "HTML" format. 3. They also allow the implementation of a configuration adapted for the sending and/or receiving of data packets.

As indicated above, the layers comprise three distinct entities.

The first layer, 130 or 230a, is essentially constituted by a software multiplexer. It allows the exchange of information between the smart card 2a and the host terminal 1, in the form of protocol data units. It plays a role similar to that of a data packet switcher. These units are sent or received via the level-2 layer (data link layer). This particular communication protocol makes it possible to put at least one pair of "intelligent agents" in communication with each other. The first agent of each pair, 132, is located in the layer 13, on the terminal 1 end, the second 232a, is located in the layer 23i on the smart card 2a end. A link between two "intelligent agents" is associated with a session. A session is a two-way data exchange between these two agents.

An intelligent agent can perform all or some of the functions of the level-3 and 4 layers, depending on the configuration used by the terminal 1.

A particular intelligent agent is advantageously identified by a whole number, for example in 16 bits (a number between 0 and 65535). This identifier is used, for example, in a protocol data unit constituting a destination reference and a source reference.

There are two main categories of intelligent agents: agents of the "server" type, which are identified by a fixed reference, and agents of the "client" type, which are identified by a variable reference delivered by the configuration management module 131 or 231a.

The process for opening a session is normally the following: an intelligent agent of the "client" type opens the session with an intelligent agent of the "server" type. The layers 130 and 230a manage tables (not represented) that contain a list of the intelligent agents present on the host terminal 1 end and on the smart card 2a end. The intelligent agents are associated with specific properties or attributes. To illustrate the concept, and to give a non-limiting example, the following six properties are associated with the intelligent agents:

"host": agent located in the terminal;

"card": agent located in the smart card;

"local": agent not communicating with the network;

"network": agent communicating with the network;

"client": agent that initiates a session;

"server": agent that receives a session request.

The intelligent agents make it possible to exchange data (hypertext, for example), but also to initiate network transactions.

The configuration management modules, 131 and 231a, respectively, can be integrated, as has been indicated, into specific intelligent agents. For example, the module 131 on the host terminal 1 end, specifically manages information related to the configuration of this terminal (operating modes), the lists of other agents present, etc. The module 231a on the smart card 2a end has similar functions. These two intelligent agents can be placed in communication with one another in order to establish a session. According to one characteristic, the smart card 2a offers the host system, i.e., the terminal 1, a virtual terminal model. To do this, the smart card 2a acts as a "web" server. The smart card 2a is "addressed" by the browser 10. It then transfers to the browser a "web" page in "HTML" language, an "applet" or any other piece of software. For example, the "web" page can be presented in the form of a welcome page that gives a choice of possible applications and/or hyperlinks to external servers.

In a practical way, the smart card 2a is advantageously "addressed" using a "URL" (for "Universal Resource Locator") address defining a loopback to the terminal 1 itself, and not pointing to an external server. For example, the structure of this "URL" is normally as follows:

http://127.0.0.1:8080 (1)

in which 127.0.0.1 is the "IP" loopback address and 8080 is the port number.

FIG. 3 illustrates, in simplified fashion, the logical architecture of a system wherein the smart card 2a comprises intelligent agents, only two of which are represented: an intelligent agent of a type not precisely defined $232a_2$ and an intelligent agent $232a_1$ of the "web" type. The logical stack comprises the lower protocol layers, referenced 200a, which comply with the ISO 7816-3 standard (FIG. 2: $CCa_1$ and $CCa_2$), the "APDU" command handler $201a_1$, and the packet multiplexer 230a, the latter being interfaced with the intelligent agents, particularly the "web" intelligent agent $232a_1$.

On the terminal end, there are two stacks, one communicating with the internet network RI, the other with the smart card 2a. The first stack comprises the elements 11 (FIG. 2: C, and $C_2$) for accessing the network (OSI 1 and 2 standards) and the "TCP/IP" protocol layers (FIG. 2: $C_3$ and $C_4$), referenced 100. The latter layers are interfaced with the "web" browser 10. The other stack comprises the lower protocol layers, referenced 101, which comply with the ISO 7816-3 standard (FIG. 2: $C_1$ and $C_2$), the "APDU" command manager 102 and the packet multiplexer 130, the latter being interfaced with intelligent agents, only one of which 132 is represented. The latter, which is assumed to be of the "network" type, can also communicate with the browser 10 via the "TCP/IP" layers 100, and with the internet network RI via these same "TCP/IP" layers 100 and the element 11 for accessing the network RI.

The "APDU" command handler 201a is also interfaced with one or more layers on the applications level, which will simply be called applications. These applications, as indicated, are applications of the conventional, so-called "cardlet" type.

In summary, the "web server" function provided by the smart card 2a can be produced by associating the "web" intelligent agent $232a_1$ in the smart card with the network agent 132 in the terminal.

The smart card 2a then actually has the "web" server functionality. Moreover, according to an important characteristic of the method of the invention, any conventional application $A_1$ through $A_n$, of the aforementioned "GCA" type, can be activated through this "web" server, either through the "web" browser 10 present in the terminal 1, or through a remote browser located at any point in the internet network RI. According to the method of the invention, the applications $A_1$ through $A_n$ do not need to be rewritten and are used as they are.

According to another characteristic of the invention, these applications remain accessible to a terminal of the conventional type, i.e. according to the prior art.

In order to meet these requirements, the "web" server function offered by the smart card 2a includes a mechanism similar to the so-called "CGI" ("Common Gateway Interface") function installed in conventional "web" servers.

Before describing an exemplary architecture according to the invention that makes it possible to produce a function of this type in the smart card itself, it is appropriate to review the chief characteristics of a "CGI" operating mode.

"CGI" is a specification for implementing, from a "web" server, applications written for the "UNIX" (registered trademark), "DOS", or "WINDOWS" (registered trademark) operating systems. For example, for the "UNIX" operating system, the specification is "CGI 1.1" and for the "WINDOWS 95" operating system, the specification is "CGI 1.3".

Again by way of example, an "HTTP" request to a "URL" address such as:

http://www.host.com/cgi-bin/xxx.cgi (2), in which "host" refers to a host system (generally remote), is interpreted by a "web" server as the execution of a command script of the "CGI" type named "xxx" and present in the directory "cgi-bin" of this host system. Although the name of the directory could theoretically be any name, conventionally it is the name given to the directory storing the "CGI" type scripts. A script is an instruction sequence of the operating system of the host system whose final result is transmitted to the "web" browser that sent the aforementioned request. Various languages can be used to write this script, for example the "PERL" (registered trademark) language.

In a practical way, the request is normally displayed on a computer screen in the form of a form included in an "HTML" page. The "HTML" language makes it possible to translate a form into a "URL" address. The form includes one or more fields, which may or may not be required, that are filled in by a user using the customary entry means: a keyboard for text, a mouse for boxes to be checked or so-called "radio" buttons, etc. The content of the form (possibly along with so-called "hidden" information and instructions) is sent to the address of the "web" server. The "HTML" code of the page describes the physical structure of the form (frame, graphics, color, and any other attribute) as well as the structure of the fields of data to be entered (name, length, data type etc.).

The transmission can take place based on two main types of formats. A first format uses the so-called "POST" method and a second uses the so-called "GET" method. Format type information is present in the code of the form page.

This mechanism, however, is not directly transposable to a smart card, even when the latter offers the "web" server functionality according to one of the characteristics of the invention.

Figure 4:
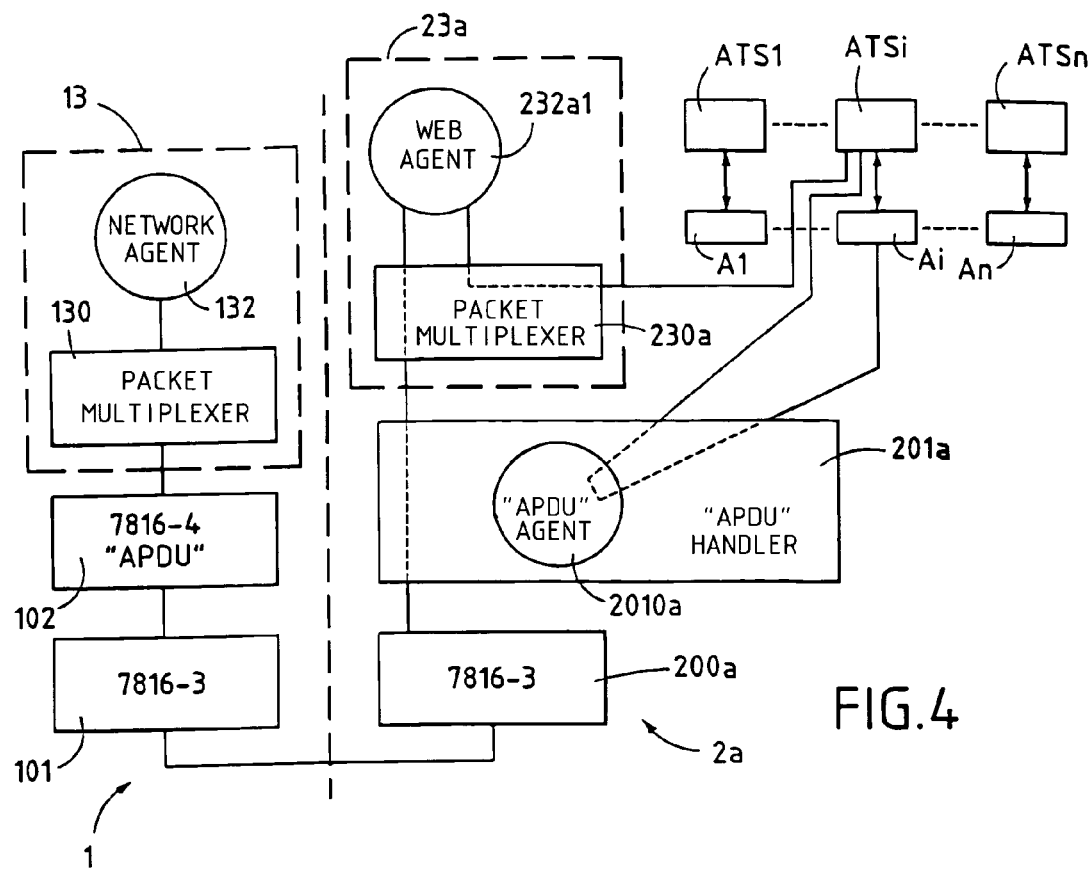
FIG. 4 illustrates a system architecture according to the invention, in which the smart card comprises script translating intelligent agents.

We will now describe an exemplary architecture that makes it possible to activate any conventional type of application via a "web" server in the smart card $2a$, in reference to FIG. 4.

In a first step, a user (not represented) calls, from his "web" browser (FIG. 3: 10), a "URL" address that may be presented in the following way:

http://@card:8080/xxx.html (3), in which "@card" is an IP address of the smart card (for example the loopback address "127.0.01" described above: see formula (1)), and "xxx.html" is a page in "HTML" language related to a particular application "xxx" offered by the smart card.

In a second step, in the manner described above, the smart card returns an "HTML" page, for example of the form type.

In a third step, the user fills in the fields of the form and transmits its contents to the smart card, usually by clicking on a particular field of the "push button" type.

The data is then sent and received by the network agent 132. The data then passes through the packet multiplexer 130 (which constitutes one of the components of the specific layer 13 on the terminal 1 end), the "APDU" command handler 102, the protocol layers 101, in order to be transmitted to the smart card $2a$. It then passes through the protocol layers $200a$, the "SPDU" command handler $201a$, the packet multiplexer $230a$ in order to be received by the "web" agent $232a_1$. Thus, a logical session is established between the two intelligent agents, as explained above.

It is appropriate to note that the data addressed to the "web" agent $232a_1$ is transported, in an essentially conventional way, in the form of "APDU" commands addressed to the particular "Packet Multiplexer" application. The "APDU" command handler $201a$ selects this application in a way entirely similar to the other applications of the "GCA" type present in the smart card $2a$, referenced $A_1$ through $A_n$. In other words, the packet multiplexer $230a$ is seen by the "APDU" command handler $201a$ as an ordinary "GCA" application.

The "HTTP" request is then analyzed by the "web" agent $232a_1$, which detects a reference to a particular directory, which will hereinafter be called, conventionally, "cgi-smart", and to a particular application, for example "xxx" in the case of the example described. The complete path in this case is therefore "cgi-smart/xxx".

According to one characteristic of the method of the invention, the above entity designates a particular script associated with an equally particular application "xxx".

In a fourth step, the script is then interpreted by an intelligent agent called a "script translating agent," which will hereinafter be called "ATS". This translation can be performed in various ways:

a/ by the "web" agent $232a_1$ itself, which in this case is equipped with a double capacity;
b/ by a unique script translating agent capable of translating all of the scripts present in the smart card $2a$;
c/ by a dedicated script agent that will hereinafter be called "ATSD" (one per script); or
d/ by an "APDU" agent $2010a$ of the "APDU" command handler $201a$, which in this case is equipped with a double capacity.

The "APDU" agent $2010a$ is a component of the "APDU" command handler layer $201a$. The latter, as has been indicated, is a layer capable of centralizing all of the "APDU" commands sent and/or received by the system, of selecting applications from among $A_1$ through $A_n$, but also of offering an interface of the intelligent agent type. It is therefore capable, according to one of the characteristics of the method, of communicating with all of the intelligent agents of the system (via sessions), whether these agents are located in the terminal 1 or the smart card $2a$.

In case c/ above, a session is opened between the "web" agent $232a_1$ and one of the "ATSD" agents.

FIG. 4 illustrates an exemplary architecture for which the translating agents are of the "ATSD" type. They are referenced $ATS_1$ through $ATS_n$ and associated with the applications $A_1$ through $A_n$. Assuming that the application selected is the application $A_i$, the session is established between the "web" agent $232a_1$ and the agent $ATS_i$.

A script translating agent generates a set of "APDU" commands. A session is opened between the translating agent, for example the agent $ATS_i$, and the "APDU" agent $2010a$. The commands are then sent to the "APDU" agent $2010a$. The "APDU" command handler $201a$ selects the "GCA" application $A_i$ (for example the "e-purse" application) and transmits it the "APDU" commands, commands that are translated and therefore conventional, which it is capable of understanding. This application is therefore correctly activated, without having to be modified or rewritten.

The responses from the "GCA" application $A_i$ are transmitted to the "APDU" command handler $201a$, to the "APDU" agent $2010a$, then again to the agent $ATS_i$ (and more generally to the script translating agent).

Figure 1B:
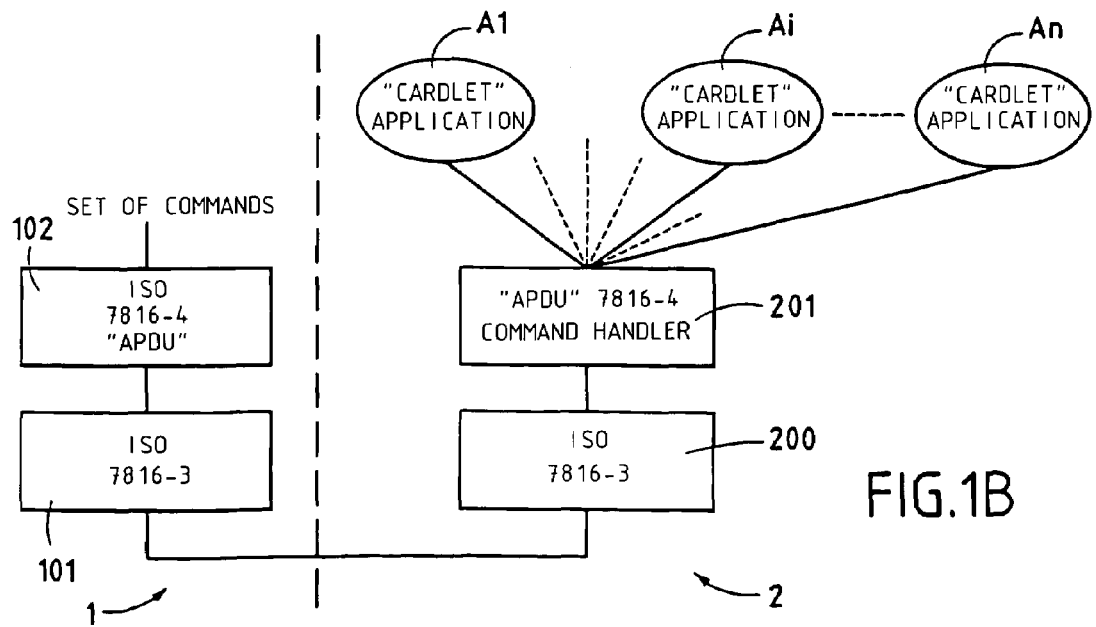

Based on the success or failure of the running of the script, the script translating agent, for example the agent $ATS_i$ in the example of FIG. 4, generates a page in "HTML" language and transmits it via the various layers used by the initial request, but in the opposite direction, in order for it to be presented on the display screen 5 (FIG. 1A).

The various paths are represented symbolically in FIG. 4 by solid lines connecting the functional blocks or by dotted lines inside these blocks.

Figure 5:
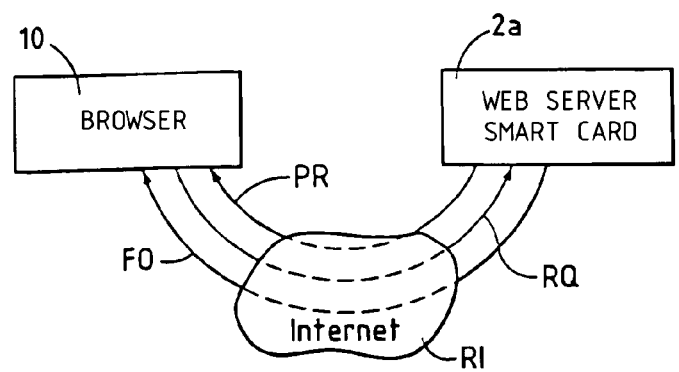
FIG. 5 is a diagram schematically illustrating the main phases of exchange between a browser and a smart card having the architecture of FIG. 4.

FIG. 5 schematically summarizes the main steps of the process that has just been described:

a/ the transmission via the Internet network RI (or from the local terminal, in either case by means of a conventional browser 10), of an "HTTP" request, referenced RQ;
b/ a response from the "web" server of the smart card $2a$, in the form of a form, referenced FO;
c/ the transmission of the filled-in form, in the form of a new request RQ; and
d/ a response in the form of an "HTML" page, referenced PR.

The response could also consist in the transmission of a file, or of a piece of software or "Applet".

By implementing the mechanisms and functions that have just been described, particularly the "web" server function and the use of intelligent script translating agents, according to an essential characteristic, the method according to the invention will make it possible to define a virtual environment, advantageously protected by the smart card. In a preferred embodiment, this environment is compatible with applications of the so-called multimedia type.

This last characteristic is particularly advantageous because the recent "web" browsers, which are entirely conventional, by their very nature make it possible to build multimedia environments (animated images, sounds, etc.). They are in fact associated with software tools, which may or may not be integrated, that make it possible to manipulate multimedia files (viewers, etc.). In any case, the browsers make it possible to download multimedia data files, which are usually large, and store them on a hard disk, for example in the terminal, or on a similar mass storage device. In particular, technologies have been proposed for displaying video sequences in real- or near-real time, or reproducing sound, from "web" sites on the Internet.

However, as has been noted, a smart card has only a small storage capacity. Moreover, it allows only a very low throughput of data during exchanges. It is therefore impossible to store a large number of data files in it. It is also practically impossible to store multimedia files, except for very short sequences or sound sequences encoded in a particular format, such as "MIDI" encoding.

Beyond these limitations of a technological nature, it is also desirable to be able to access remote applications, while enjoying a high level of security, which only the use of a smart card can offer.

The method according to the invention allows this mode of operation. The chip-card protected virtual multimedia environment, according to a preferred embodiment, makes it possible to:

define virtual objects that the smart card can access;
provide methods for accessing these objects.

FIG. 6 schematically illustrates this essential aspect of the method according to the invention.

A user $U_i$ interrogates the smart card $2a$ using the "web" browser 10 contained in the terminal 1. Using a mechanism that will be described below, particularly by means of the "web server" function described above, the smart card $2a$ will return to the browser a list of so-called virtual objects $Obv_i$, i being an arbitrary subscript, to which it has access, i.e. in practice, to which the smart card $2a$ or the user $U_i$ has access rights. In essence, these access rights can be strictly linked to the smart card $2a$ and unchangeable. They can also be linked to a user profile, the user $U_i$ supplying, for example, identification data and a password. The smart card $2a$ performs a verification through a comparison with data in a security database stored in a read-only memory, and if the result of the comparison is positive, supplies a list of virtual objects $Obv_i$ associated with the "identification data/password" pair. In an essentially known way, this first phase can implement a method for encrypting data exchanged between the terminal and the smart card $2a$ or implement a secure transmission protocol "HTTPS." The smart card $2a$ will also supply a list of methods for accessing the virtual objects $Obv_i$.

The virtual objects $Obv_i$ which are either static or dynamic as indicated above, can be located either in the smart card $2a$ or in the terminal 1, or more generally in any system connected to the internet network RI. According to one characteristic of the invention, this location is "transparent" for the browser 10, and hence for the user $U_i$, as will be shown.

The method according to the invention specifically uses what will hereinafter be called a virtual file management system, or "SGFV," and a specialized script translating intelligent agent that will be called "ATSDA/SGFV," dedicated to this task. This intelligent agent supplies the list of virtual objects $Obv_i$ that the smart card $2a$ can access. A particular "URL" address is associated with each virtual object $Obv_i$. The call-up of this "URL" from the "web" browser 10 makes it possible to instantiate the virtual object $Obv_i$ using a given call method, which may or may not be specific to this object.

First, we will briefly summarize the chief characteristics of a conventional file management system, hereinafter called "SGF." Such a system is used to store information on a medium such as a hard disk. The information is stored in the form of a file. A file, whether pure data or program instructions, is conventionally composed of a set of fixed-size blocks. A well known mechanism makes it possible to obtain a list of the storage blocks that constitute the file and their addresses in the memory.

A directory is a particular file whose content is a list of file descriptors. Such a descriptor comprises, for example, the following elements:

the name of the file;
the length of the file;
the creation date;
a reference that makes it possible to retrieve a list of the blocks of the file (number of the first block, table of the block numbers, etc.); and
attributes that specify particular properties of the file (directory, read, write, execution, etc.).

The first directory is normally called the root directory. A directory that is not a root is called a sub-directory. The directory that contains the descriptor of a given file is its father directory. The address of a file in the "SGF" is therefore a sequence of directory names, from the root directory to the father directory of the file, which defines a path. For example, such a path appears as follows:

"/root/directory1/directory2/file_name" (4), the numbers 1 and 2 being arbitrary, "root" being the name of the root directory, and "file_name" being any file name.

For a smart card, the ISO 7816-4 standard defines the root directory called "MF" (for "Master File"), sub-directories called "DF" (for "Dedicated Files") and elementary files called "EF" (for "Elementary Files").

Within the scope of the invention, the file management system "SGFV", which will be referred to as "virtual," makes it possible to define virtual objects $Obv_i$ to which the smart card $2a$ can have access. According to the method of the invention, a virtual object $Obv_i$ is associated with a virtual elementary file. The content of a virtual elementary file is constituted by the set of information that makes it possible to access the associated virtual object $Obv_i$ and to obtain an instance of same in the terminal 1.

In a practical way, as illustrated schematically by FIG. 7, the system "SGFV" can constitute a subset of a standard "SGF" system, and more precisely, an "SGFV" is contained in an elementary file, as defined by the aforementioned ISO 7816-4 standard.

A file descriptor generally comprises the following elements;

the name of the file;
the length of the file;
the creation date;
a reference (advantageously a whole number) that makes it possible to retrieve a list of the blocks of the file (number of the first block, table of block numbers, etc.): a virtual file is identified by its name or this unique reference; and
attributes of the file that specify the particular references of the file: directory or elementary file, virtual or non-virtual, direct or indirect.

A "direct virtual object" is an object that is instantiated from the smart card $2a$. It is typically a static virtual object $Obv_i$ that can be manipulated by the browser, for example displayed (image, etc.). An "indirect virtual object" is a virtual object $Obv_i$ that is instantiated from the browser 10, typically by means of an "applet."

FIG. 8 schematically illustrates the architecture of a chip-card system that makes it possible to instantiate a virtual object $Obv_i$ located anywhere in the internet network RI via the browser 10 and the smart card 2a. The elements common to the previous figures have the same references, and will be re-described only as necessary.

The architecture illustrated in FIG. 8 is very similar to that of FIG. 4. The essential difference lies in the fact that it provides an "SGFV" 8 stored in the smart card 2a, and a specific script translating intelligent agent "ATSDA/SGFV", referenced 7. The operating mode is similar to that illustrated by FIG. 4 when wishing to access a particular application $A_i$. It is therefore unnecessary to re-describe it in detail. In the present case, the particular application is replaced by the virtual file management system "SGFV" 8. To begin with, a session is established between the network intelligent agent 132 and the "web" intelligent agent $232a_1$. According to the mechanism described above, a session is then established between the "web" agent $232a_1$ and the intelligent agent "ATSDA/SGFV" 7.

In a practical way, the intelligent agent "ATSDA/SGFV" 7 is accessible using "URLs," typically of the following type:

"http://www.host.com/cgi-smart/sgfv?" (5)

in which "sgfv" is an application of the "CGI" type associated with the intelligent agent "ATSDA/SGFV" 7. The above request makes it possible to scan the tree of directories and "show" their content to the browser 10, by means of an "HTML" page. The "leaves" of the tree are virtual or non-virtual elementary files associated with a hyperlink. The transmission in the "smart card 2a-terminal 1" direction is performed as explained in connection with FIG. 4.

In other words, the intelligent agent "ATSDA/SGFV" 7 associates a "URL" address with any element of the "SGFV" 8, be it a directory or an elementary file. The "URL" address of a directory designates an "HTML" page that contains the list of its elements. The "URL" address of an elementary file makes it possible to create an instance of the virtual object $Obv_i$ associated with this virtual file.

To illustrate the concept, if one uses the above "URL" address (5), one obtains an "HTML" page that presents the contents of the root directory to the browser 10. This root directory is constituted by a set of sub-directories and files, as illustrated schematically by FIG. 9. In this figure, we have represented a root directory rep#0, at the top level, a real elementary file fe#7, and a real sub-directory srep#1 at the lower intermediate level, and a virtual sub-directory rep#2 and a virtual elementary file fe#5 at the lowest level, both of which are dependent on the real sub-directory srep#1, the reference numbers being purely arbitrary.

During a first phase, the intelligent agent "ATSDA/SGFV" 7 transmits to the browser 10, in response to the request received, an "HTML" page (not represented) showing, in one form or another, the hierarchical structure of the "SGFV" 8. The page is normally displayed on a display screen (FIG. 1A: 5), for example in the form of a menu. Each line of the menu is constituted by a hyperlink describing a sub-directory or an elementary file. The display can advantageously be in graphical form, and may or many not be associated with a descriptive text, the image of the tree of FIG. 9 being displayed on the aforementioned screen. It is also possible to display icons or complex (for example three-dimensional) forms, each being associated with one of the virtual objects to be instantiated, and possibly representing their nature (for example, a camera representing a video file), which may or may not be associated with a descriptive text.

The user $U_i$ is prompted to click on a hyperlink (on a node or on a branch in the case of a graphical image). Through this action, he will be able to obtain an instance of the desired virtual object $Obv_i$.

The "SGFV" 8 is advantageously stored in a re-programmable memory contained in the smart card 2a, for example an "EEPROM" (electrically erasable memory), as illustrated schematically in FIG. 10. The "SGFV" 8 reproduces the structure of the tree of FIG. 9.

Again in the example described, having obtained the menu page, obtained during an initial phase by clicking on a "URL," which could typically be the following:

"http://www.host.com/cgi-smart/sgfv?/file#5 (6), the user $U_i$ obtains an instance of the virtual object $Obv_5$ associated with the elementary file referenced fe#5 in FIG. 10. Similarly, he could have obtained the contents of a sub-directory, the parameter "file#5" being replaced with "file#x" in (6), #x being the number associated with the sub-directory.

The non-virtual files are stored in the smart card 2a and conform to the usual paradigm that governs "SGFs." They contain data, for example keys, necessary to the intelligent agent "ATSDA/SGFV" 7.

There are various possible conventions for defining the information required for the instantiation of a virtual object $Obv_i$, for example:
  a virtual file of null length inherits access methods from its father directory;
  a virtual directory is associated with a virtual elementary file whose name is keyed (for example "virtual"), and which contains the access methods of this directory.

In essence, in addition to the list of the accessible virtual objects $Obv_i$, an intelligent agent "ATSDA/SGFV" 7 must also supply a method for accessing a given virtual object, from all or part of the information contained in a virtual elementary file. FIG. 11 schematically illustrates this process.

According to the method of the invention, two access methods, respectively called direct and indirect, are provided, in accordance with the attributes of the virtual elementary file in question.

The direct method consists in a description of a chain of intelligent agents used in the process for accessing a virtual object $Obv_i$ and for obtaining an instance of same in the terminal. When a session is opened, a given intelligent agent receives, from the agent that initiated this session, a list of call structures that will hereinafter be called a "call method" or "Method PDU" (for "Method Protocol Data Unit").

A call structure comprises:
  an identifier of the intelligent agent with which the session is opened;
  data, or arguments, required for its utilization.

The first intelligent agent addressed by the aforementioned list "consumes" a first call structure that is addressed to it. It transmits the rest of the structure list to the next intelligent agent, with which it establishes a session, until the end of the list is reached.

Figure 12:
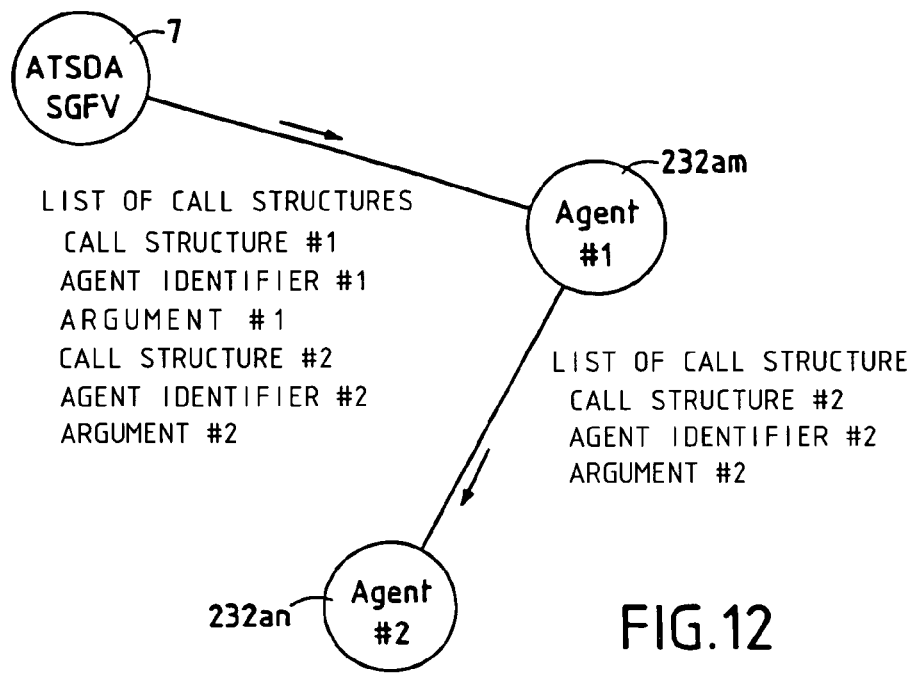

To illustrate the concept, an example of the various stages of exchange between the intelligent agent "ATSDA/SGFV" 7 and two cascaded intelligent agents, $232a_m$ and $232a_n$, is illustrated schematically by FIG. 12. The call structure list sent by the intelligent agent "ATSDA/SGFV" 7 actually comprises two distinct sub-lists, respectively referenced #1 and #2 in their headers. The first one is consumed by the first intelligent agent 232 am, and the second by the second intelligent agent $232a_n$. An intelligent agent, for example the intelligent agent $232a_m$, is identified by a reference, or agent identifier ("Agent Identifier #1" or "Agent Identifier #2"). The intelligent agent addressed, with which a session is established, retains the sub-list that is addressed to it by means of the header ("Call Structure #1" or "Call Structure #2"). The arguments of the sub-list that it retains ("Argument#1" or "Argument#2") are constituted by a set of data necessary to the proper functioning of this agent. For example, a piece of data could be a (non-virtual or virtual direct) file name.

A given intelligent agent, for example the intelligent agent $232a_m$, can modify the rest of the call structure list before transmitting it to the next intelligent agent, $232a_n$. To do this, it addresses this intelligent agent $232a_n$, and establishes a session with it.

The call method can advantageously be described using the the ASN.1 language (the ISO's "Abstract Syntax Notation 1").

The direct access method makes it possible to definitively instantiate a virtual object $Obv_i$ directly from the smart card $2a$. A priori, it is a static object. The instantiated object is normally presented in the form of an "HTML" page or an "applet" transmitted to the browser 10.

The second access method, or indirect access method, is in reality also a direct access method, but is implemented from the terminal 1 and not from the smart card $2a$. This method is essentially used to instantiate virtual objects $Obv_i$ of the dynamic type.

According to this variant of the method, in response to a "URL" that designates a virtual elementary filefe#x, the intelligent agent "ATSDA/SGFV" 7 transmits to the browser 10 an "HTML" page that contains a hyperlink that points to the direct access method associated with the virtual object $Obv_i$.

There are two variants that can be implemented. The first variant consists of using an "applet." The link to the access method in this case is an "applet" located at the address "@card," which itself can be designated by:
  the name (i.e., a "URL") of a non-virtual file stored in the smart card $2a$;
  a "URL" that designates a virtual direct file.

A call parameter of this "applet" is a call structure list, for example coded in ASN.1 as indicated above. The "applet" contained in an "HTML" page is downloaded from the smart card $2a$ or the internet network RI to the browser 10, which is forced to execute it. This "applet" establishes a session with a first intelligent agent, arbitrarily referenced $232a_p$. The connection to this intelligent agent $232a_p$ uses, for example, a data exchange model of the "TCP/IP" client/server type (i.e., the class known as "socket JAVA"). The "applet" acts as a "TCP/IP" client and connects to a "TCP'IP" server (the latter also being an intelligent agent) identified by the address of the card and a port: "@card: port".

Figure 13:
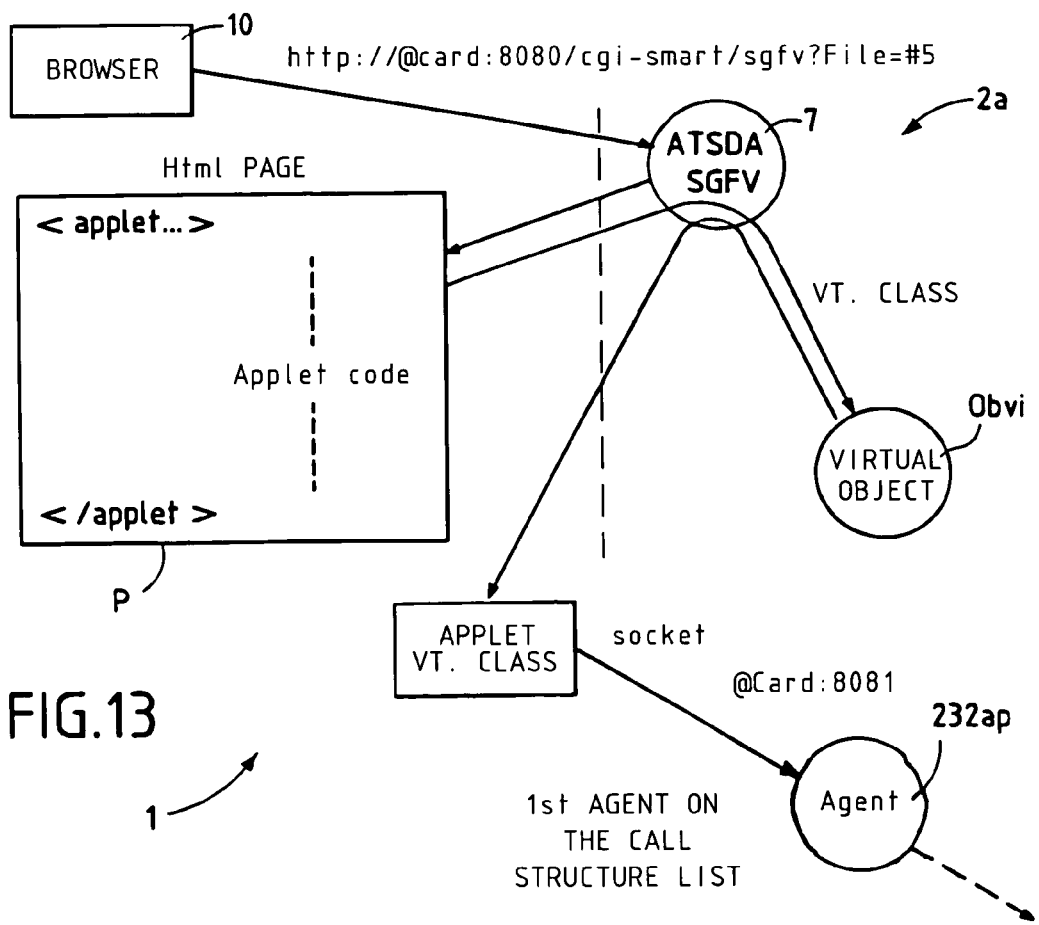

FIG. 13 schematically illustrates the various phases of the exchanges for instantiating a virtual object using the indirect method. This FIG. 13 includes the parameters of the example described above, i.e., the virtual elementary filefe#5, which is translated into the "URL" address with the configuration (6) above. It is assumed that the address of the smart card to be used is "@card" and the port 8080. The request is transmitted to the intelligent agent "ATSDA/SGFV" 7 according to the process described above. The latter returns to the browser 10 an "HTML" page P constituted by an "applet." In order to simplify the drawing, the various instructions of this "applet" have been summarized in FIG. 13 by the notation "Applet code" placed between the markers <applet . . . > and </applet>. In an essentially known way, the "applet" is associated with a "Java" class, which is arbitrarily called "vt.class", for ""virtual terminal." The code also includes instructions indicating the address of the first intelligent agent of the list structure, referenced $232a_p$, and the address of the port to use, in this case the address "@card" and the port 8081. It should be noted that this intelligent agent $232a_p$ can be located in the smart card $2a$ or in the terminal 1.

The next phase consists, for the browser, of requesting the applet from the card $2a$ using the call structure list, which defines the call parameters of the applet. In response, the card transmits it the applet, which will be loaded by the browser into its virtual "Java" machine, where it will be executed. For the browser, the next phase consists of calling the intelligent agent $232a_p$ using the "socket" class of the "Java" language.

Each intelligent agent, for example $232a_p$, executes a precise task: decryption of an encrypted message, verification of passwords and/or security data, conversion of a file from a first format to another one, etc. Although only one intelligent agent $232a_p$ is represented, it is possible to provide, as necessary, several cascaded intelligent agents as in the preceding case (FIG. 12), which is illustrated in FIG. 13 by dotted lines. Also as before, each intelligent agent $232a_p$ consumes a part of the list structure that is addressed to it, and transmits the rest, either unchanged or modified, to the next intelligent agent (not represented).

To better illustrate the first variant, and to illustrate the concept, let us assume that the user $U_i$ wants to download and execute an audio file, for example coded in the "MP3" format. This file constitutes one of the virtual objects, here referenced FS, offered by the "HTML" menu page transmitted by the intelligent agent "ATSDA/SGFV" 7 during the initial phase. FIG. 14 schematically illustrates the sequence of steps for instantiating such a virtual object, referenced FS. It is assumed that the browser 10 does not have an appropriate reader for such a format. This reader, referenced LS, is searched for on an Internet site, which may or may not be different from the site where the sound file FS is located.

In the example described, the sequence of steps is as follows:
  a/ the user $U_i$ clicks on a hyperlink (text, icon or any other graphical representation of the object to be searched for, i.e. the file FS): a request $I_1$ is transmitted to the smart card $2a$;
  b/ in response, $R_1$, an "HTML" page is transmitted by the smart card $2a$ to the terminal 1 and to the browser 10;
  c/ the "HTML" page received forces the browser 10 to request an "applet": interrogation $I_2$ (in the present case, this means searching for the appropriate sound reader LS);
  d/ in response, $R_2$, the reader sought LS is downloaded and installed in the terminal 1;
  e/ the browser 10 again addresses the smart card $2a$, request $I_3$, in order to obtain an instance of the audio file FS; and
  f/ in response, the browser 10 receives this audio file FS, which can be read, i.e. played, by the terminal 1, which now has the appropriate sound reader LS.

It must be noted that all the operations are transparent for the user $U_i$, more precisely for the browser 10, which "knows" only the smart card $2a$. The reader LS (or more generally another "applet") and/or the virtual object sought, i.e. the file FS in the example, had their sizes been compatible with the storage capacity of the smart card 2a, could then have been stored in the latter (loopbacks symbolized by dotted lines in FIG. 14). The browser 10 does not know the exact location of the virtual objects $Obv_i$. Only the smart card 2a, or more precisely the intelligent agent "ATSDA/SGFV" 7, knows the location of the virtual objects of the list of the "SGFV" 8 and the method for accessing them.

In a preferred variant of the method, the intelligent agent "ATSDA/SGFV" 7 also knows the list of the only virtual objects accessible to a given user $U_i$ (authorizations). It is therefore a secure system. The term "secure" should be considered in its broadest sense. For example, it relates to a payment card that gives access to certain resources, based on a given subscription for example, or cards that provide actual secure access to confidential resources, based on a level of clearance, for example. As indicated, the resources or virtual objects $Obv_i$ can be constituted by transactions.

This constitutes a characteristic of the method according to the invention.

According to a second variant, illustrated schematically in FIG. 15, it is possible to use a hyperlink that defines the "TCP/IP" address of the first intelligent agent associated with the access method. The address is of the type: "@Agent:AgentPort", with "@Agent" being the actual address of the intelligent agent in question and "AgentPort" being the port of the latter. The list "MethodPDU" in this case is a parameter of a "URL." The hyperlink is associated, for example, with an image or a form of an "HTML" page P'.

Thus, for example, a "URL" having the following structure:

http://@Agent:AgentPort/MethodPDU?Value-xx . . . (7), makes it possible to reach an intelligent agent that acts as a "TCP/IP web" server, arbitrarily referenced $232a_q$. This intelligent agent $232a_q$ is located at the address Agent:AgentPort" and receives the call structure list "MethodPDU" with the parameter "Value=xx . . . ".

To illustrate the concept, let us assume that the virtual object $Obv_i$ is an image to be displayed on a screen (FIG. 1A:5) in a particular format using the browser 10, and that the latter does not have an appropriate program for this display, generally called a "viewer." This could be, for example, a program executable by the operating system used in the terminal 1, of the "XXX.exe" type, with "XXX" being the name of the program. The action of clicking on the above hyperlink (7) will make it possible to search for this executable program, which can be located in the terminal 1 or in a remote system.

The difference between the two variants of embodiment is that in the first case, the browser is "forced" to request the loading of an "applet." All of the steps are performed automatically. In the second case, the user $U_i$ is prompted to click on a hyperlink or to execute a similar action.

Through the reading of the above, it is easy to see that the invention clearly achieves the objects set forth.

It must be clear, however, that the invention is not limited to just the exemplary embodiments explicitly described, particularly in connection with FIGS. 2 through 15. In particular, as concerns the other script translating intelligent agents, the function of the intelligent agent associated with the virtual file management system can be fulfilled by a non-dedicated agent: the "web" agent or the "APDU" agent.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. An embedded system adapted to cooperate with a network through a terminal and comprising a chip having a processor configured to process information and a memory for information storage,
    said memory storing at least one object file containing information associated with an object located in the network and making it possible to create an instance of said object; and
    said processor including a network interface adapted to cooperate with a matching network interface located in the terminal through an object file interface, comprising at least one intelligent agent for establishing correspondence, including one or more of protocol conversion and script translation, between information exchanged with said object file and information passing through the network interface means, and assigned to at least said object file, so that the embedded system constitutes an information server in the network.

2. An embedded system according to claim 1, wherein the object file comprises a piece of autonomous software executable in browser software.

3. An embedded system according to claim 1, wherein said network interface means is adapted to cooperate with the matching network interface located in the terminal, such that the embedded system behaves like a client capable of connecting to at least one server of the network.

4. A method for instantiating an object located in a network, comprising using an embedded system adapted to cooperate with a network through a terminal and comprising a chip having a processor configured to process information and a memory for information storage, the embedded system storing at least one object file containing information associated with an object located in the network for creating an instance of said object, and further comprising a network interface designed to cooperate with a matching network interface located in the terminal through an object file interface, comprising at least one intelligent agent for establishing correspondence, including one or more of protocol conversion and script translation, between information exchanged with said object file information passing through the network interface means and assigned to at least said object file so that the embedded system constitutes an information server in the network the method comprising:
    establishing a list of the at least one agent implemented; and
    for each agent, defining call arguments necessary to the agent so as to describe a set of sessions between agents using an object file.

5. A method according to claim 4, further comprising describing the opening of a session with another agent by a call argument.

6. A method according to claim 4 further comprising modifying the list of arguments used by a first agent by another agent.

7. A method for instantiating an object located in a network comprising using an embedded system designed to cooperate with a network through a terminal and comprising a chip having a processor configured to process information and a memory for information storage, the embedded system storing at least one object file containing information associated with an object located in the network and for creating an instance of said object, and further comprising a network interface designed to cooperate with a matching network interface located in the terminal through an object file interface, comprising at least one intelligent agent for establishing correspondence, including one or more of protocol conversion and script translation, between information exchanged with said object file and information passing through the network interface and assigned to at least said object file, so that the embedded system constitutes an information server in the network, the method comprising the steps of:

identification of an object file; and execution of this object file from the information server of the embedded system so as to implement sessions between the one or more agents described by the object file.

8. A method according to claim 7, wherein the object file is executed by instantiating the first agent associated with the object file.

9. A method according to claim 7, wherein the object file is executed by instantiating one or more agents referenced by the object file.

10. A method for instantiating an object located in a network comprising using an embedded system adapted to cooperate with a network through a terminal, and comprising a chip having a processor configured to process information and a memory for information storage, the embedded system storing at least one object file containing information associated with an object located in a network and for creating an instance of said object, and further comprising a network interface designed to cooperate with a matching network interface located in the terminal through an object file interface, comprising at least one intelligent agent, for establishing correspondence, including one or more of protocol conversion and script translation, between information exchanged with said object file and information passing through the network interface, and assigned to at least said object file, so that the embedded system constitutes an information server in the network, the method comprising the steps of:

loading an object file and a specific software capable of implementing the object file by browser software; and execution of the specific software by the browser software so as to implement sessions between the one or more agents described by the object file executed from the browser software.

11. A method according to claim 10, wherein the specific software is embodied in an interpreted language executable by the browser software.

12. A method according to claim 10, wherein an object file interpreter is embodied in the browser software.

13. A method for instantiating an object located in a network comprising using an embedded system adapted to cooperate with a network through a terminal, and comprising a chip having a processor configured to process information and a memory for information storage, the embedded system storing at least one object file containing information associated with an object located in the network for creating an instance of said object, and further comprising a network interface adapted to cooperate with a send matching network interface located in the terminal, such that the embedded system constitutes an information server in the through an object file interface, comprising at least one intelligent agent adapted to establish a correspondence, including one or more of protocol conversion and script translation between information exchanged with said object file, and information passing through the network interface means, and assigned to at least said object file so that the embedded system constitutes an information server in the network, the method comprising the step of identifying, by a universal resource identifier, a specific software implementing the browser software so as to enable the embedded system to implement sessions between the one or more agents described by the object file executed from the browser software.

14. A method according to claim 13, wherein the universal resource identifier is integrated into a hypertext document.

15. A method according to claim 13, wherein said specific software is loaded by a method available in the browser software and deduced from the universal resource identifier.

* * * * *

UNITED STATES PATENT AND TRADEMARK OFFICE
CERTIFICATE OF CORRECTION

PATENT NO. : 6,944,650 B1 Page 1 of 1
APPLICATION NO. : 09/700428
DATED : September 13, 2005
INVENTOR(S) : Urien It is certified that error appears in the above-identified patent and that said Letters Patent is hereby corrected as shown below:

Column 22, Line 18 -- delete the word "means"-.

Column 22, Line 45 -- insert ", and" before the word "information"

Column 24, Line 18 -- delete the word "send".

Column 24, Line 19 -- delete the words "such that the embedded system constitutes an information server in the".

Signed and Sealed this

Twenty-ninth Day of August, 2006

JON W. DUDAS
*Director of the United States Patent and Trademark Office*